(12) United States Patent
Zheng et al.

(10) Patent No.: US 8,379,295 B2
(45) Date of Patent: Feb. 19, 2013

(54) OPTICAL DIFFERENTIAL PHASE-SHIFT KEYED SIGNAL DEMODULATOR

(75) Inventors: Xueyan Zheng, Andover, MA (US); Kevin McCallion, Charlestown, MA (US)

(73) Assignee: Finisar Corporation, Sunnyvale, CA (US)

( * ) Notice: Subject to any disclaimer, the term of this patent is extended or adjusted under 35 U.S.C. 154(b) by 428 days.

(21) Appl. No.: 12/687,570

(22) Filed: Jan. 14, 2010

(65) Prior Publication Data

US 2011/0170171 A1     Jul. 14, 2011

(51) Int. Cl.
  *G02F 2/00*    (2006.01)
  *G02F 1/35*    (2006.01)
(52) U.S. Cl. ........................................ 359/325
(58) Field of Classification Search ............ 359/325
  See application file for complete search history.

(56) References Cited

U.S. PATENT DOCUMENTS

| | | | | |
|---|---|---|---|---|
| 6,456,422 | B1* | 9/2002 | Hayes et al. | 359/325 |
| 7,259,901 | B2* | 8/2007 | Parsons et al. | 359/237 |
| 7,411,726 | B2* | 8/2008 | Caplan | 359/325 |
| 7,526,210 | B2* | 4/2009 | Liu | 398/188 |
| 7,529,490 | B2* | 5/2009 | Hoshida | 398/207 |
| 7,756,385 | B2* | 7/2010 | Tomaru | 385/147 |
| 7,860,394 | B2* | 12/2010 | Hoshida | 398/74 |
| 7,865,086 | B2* | 1/2011 | Tomaru | 398/204 |
| 2010/0284703 | A1* | 11/2010 | Suzuki | 398/212 |

* cited by examiner

*Primary Examiner* — Daniel Petkovsek
(74) *Attorney, Agent, or Firm* — Maschoff Gilmore & Israelsen

(57) ABSTRACT

A phase-shift keyed signal demodulator is disclosed including a filter positioned to receive an input beam, a first photodiode positioned to receive light reflected from the filter, and a second photodiode positioned to receive light transmitted through the filter. A difference between outputs of the first and second photodiodes is interpreted to determine a data value encoded in the input beam. In another embodiment N filters receive inputs from a splitter and include transmission functions offset from one another. N pairs of photo diodes receive the transmitted and reflected beams from each filter and a decoder converts the outputs of the pairs of photodiodes to one or more data symbols.

13 Claims, 17 Drawing Sheets

US 8,379,295 B2

OPTICAL DIFFERENTIAL PHASE-SHIFT KEYED SIGNAL DEMODULATOR

BACKGROUND OF THE INVENTION

1. The Field of the Invention

This application relates to the demodulation of optical signals and, more particularly to demodulation of phase shift keyed signals.

2. The Relevant Technology

A phase shift keyed (PSK) optical signal may include a return-to-zero (RZ) signal having series of relatively high intensity pulses separated by low intensity regions. A PSK optical signal may also be embodied as a non-return to zero (NRZ) signal. The phase difference between adjacent pulses encodes information. For example, a phase difference of $\pi$ may encode a one where as a phase shift of zero or $2\pi$ encodes a zero bit. PSK signals have a distinct advantage in that both the zero bit and the one bit contain the same amount of optical energy, which enables a higher signal-to-noise ratio (SNR) at a demodulator as compared to encoding methods wherein a logical zero is encoded by a signal portion having a lower intensity than a logical one.

Demodulation of a PSK signal includes converting the phase information encoded in the pulses into amplitude modulation such that the data can be detected by means of a photodiode or other optical sensor. In a conventional demodulator, this is accomplished by means of a delay line interferometer (DLI), such as a Mach-Zehnder interferometer or Michelson interferometer. A DLI operates by dividing an input beam into first and second beams, such as by means of a beam splitter. The first and second beams travel along paths of different lengths and are then rejoined into an output beam, such as by means of another beam splitter. The difference in path length is chosen such that upon recombining, the first and second beams will constructively or destructively interfere with one another depending on the phase difference between adjacent pulses.

A conventional DLI-based demodulator has a number of significant disadvantages. In particular, the DLI-based demodulators tend to be large in size inasmuch as the difference in path length between the first and second paths must be large enough to introduce a one-bit delay. DLI-based demodulators are also somewhat expensive to manufacture because of the delay between the first and second paths must be precisely tuned.

In view of the foregoing it would be an advancement in the art to provide a DPSK demodulator that was more compact and less expensive to manufacture than prior DLI-based demodulators.

BRIEF SUMMARY OF THE INVENTION

In one aspect of the invention, a phase-shift keyed signal demodulator includes a filter positioned to receive an input beam, a first photodiode positioned to receive light reflected from the filter, and a second photodiode positioned to receive light transmitted through the filter. The output of the first and second photodiodes is compared to determine a bit value. In some embodiments, a decoder is electrically coupled to the first and second photodiodes and is programmed to determine a phase relationship between adjacent bits within the input beam according to a difference between outputs of the first and second photodiodes. In other embodiments, a decoder is not used.

In another aspect of the invention, a delay element is positioned to receive one of the light transmitted through the filter and light reflected from the filter. The delay element has a delay such that corresponding portions of the first and second beams arrive substantially simultaneously at the first and second photodiodes.

In another aspect of the invention, the first and second photodiodes are matched and are formed on a common substrate.

In another aspect of the invention, the filter has a bandwidth that is about one half of a bit rate of the input beam or it can be optimized based on in-line filter used in transmission link. Alternatively, the filter has a free spectral range that is about equal to the bit rate of the input beam or it can be optimized based on in-line filter used in transmission link.

In another aspect of the invention, a phase-shift keyed signal demodulator includes a splitter having an input and N outputs. The splitter is configured to divide an input beam into N output beams emitted from the N outputs. N filters are positioned to receive the N output beams and N pairs of photodiodes include first and second photodiodes positioned to receive the reflected and transmitted signals, respectively, from each of the N filters. A decoder is electrically coupled to the N pairs of photodiodes and programmed to output a data word having a length greater than or equal to N according to an evaluation of the outputs of the N pairs of photodiodes.

In another aspect of the invention, the passbands of the N filters are spectrally offset from one another. The passbands of the N filters may be spectrally offset from one another by an integer multiple of at least $1/(2N)$ of a free spectral range of at least one of the N filters. Alternatively, the passbands of the N filters are spectrally offset from one another by an integer multiple of at least $1/(N)$ of a bandwidth of at least one of the N filters.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only illustrated embodiments of the invention and are therefore not to be considered limiting of its scope. The invention will be described and explained with additional specificity and detail through the use of the accompanying drawings in which.

DETAILED DESCRIPTION OF THE PREFERRED EMBODIMENTS

Figure 1:
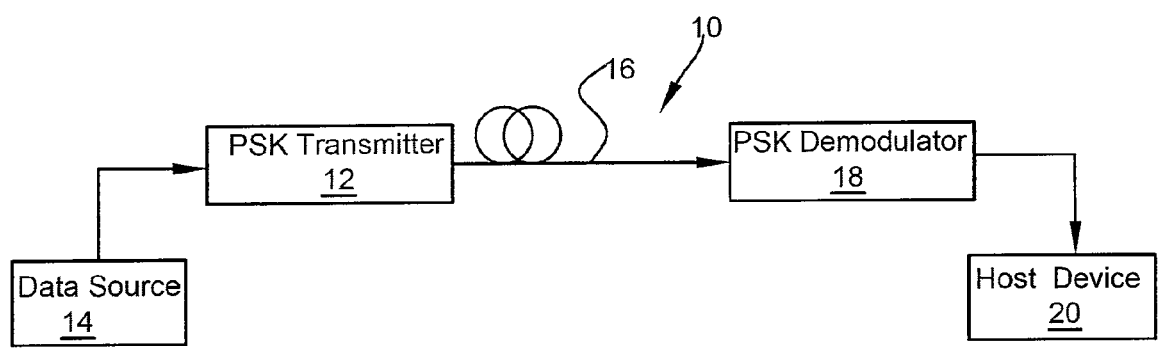
FIG. 1 illustrates a fiber optic communication system suitable for use in accordance with the present invention.

Referring to FIG. 1, an operating environment 10 suitable for use in accordance with embodiments of the present invention may include a phase-shift keyed (PSK) transmitter 12 that encodes data from a data source 14 into a PSK optical signal. The PSK transmitter 12 may encode the data into a differential phase shaft keyed signal (DPSK), a differential quadrature phase-shift keyed signal (DQPSK), or a differential N phase-shift keyed signal (DNPSK). Examples of a DNSPK transmitter are disclosed in U.S. Pat. No. 7,474,859 entitled VERSATILE COMPACT TRANSMITTER FOR GENERATION OF ADVANCED MODULATION FORMATS and U.S. patent application Ser. No. 12/014,676 entitled CHIRPED LASER WITH PASSIVE FILTER ELEMENT FOR DIFFERENTIAL PHASE SHIFT KEYING GENERATION, which are hereby incorporated herein by reference in their entirety. The PSK signal generated by the PSK transmitter 12 is transmitted over an optical fiber 16 to a PSK demodulator 18. The PSK demodulator converts the PSK signal into a data symbol, which is then transmitted to another device for storage and/or processing, such as a host device 20.

Figure 2A:
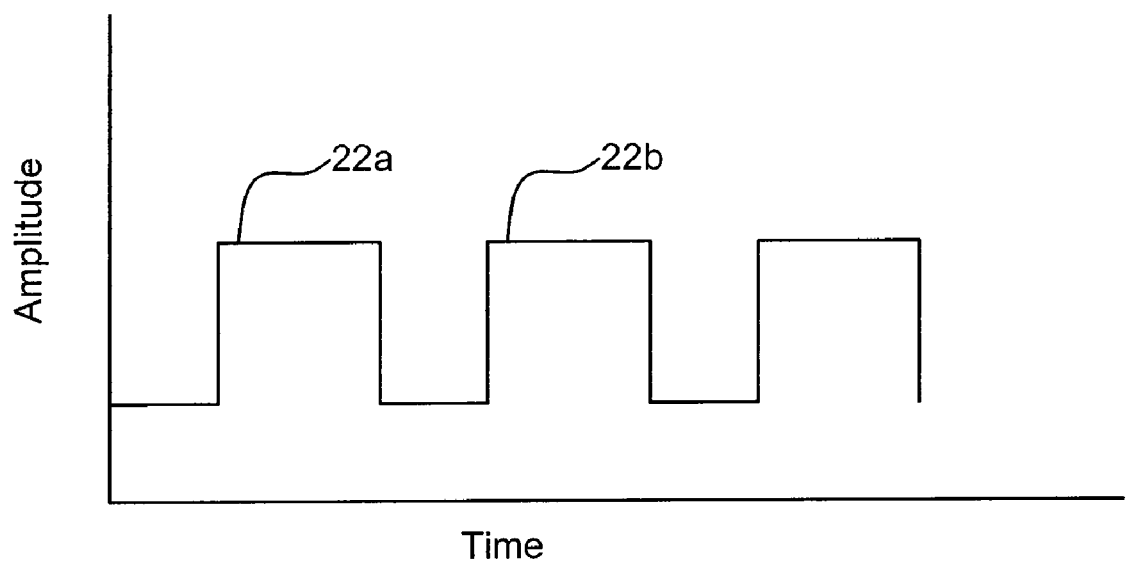
FIGS. 2A and 2B illustrate attributes of a DPSK signal suitable for demodulation in accordance with the present invention.
Figure 2B:
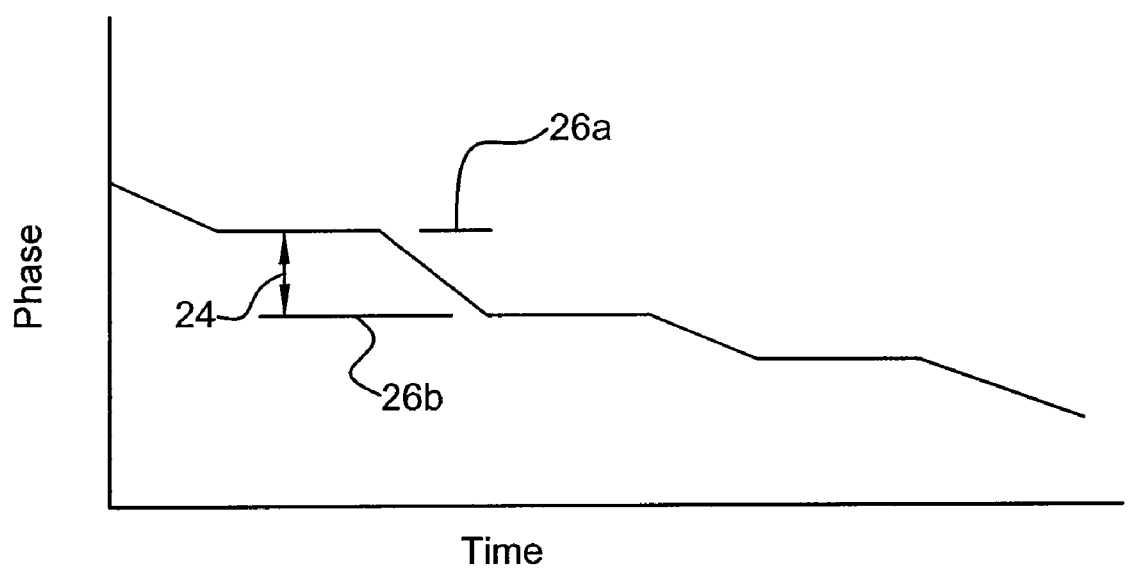

Referring to FIG. 2A, a PSK signal, such as a DPSK, DQPSK, or DNPSK, signal may have the illustrated return-to-zero (RZ) amplitude profile including pulses 22a, 22b separated by local minima. Each pulse 22b has a phase difference 24 relative to a preceding pulse 22a as shown by the phase profile of FIG. 2B. The difference 24 between the phases 26a, 26b of the pulses 22a, 22b, respectively, encodes information. In a DPSK modulation scheme, a phase difference 24 of $\pi$ may encode a one bit whereas a phase difference of 0 or a multiple of $2\pi$ encodes a zero bit. In DQPSK the phase differences 24 of 0, $\pi/2$, $\pi$, and $3\pi/2$ are each assigned a unique two-bit value. In DNPSK, N possible phase differences 26 each encode one of N unique multi-bit values.

Figure 3A:
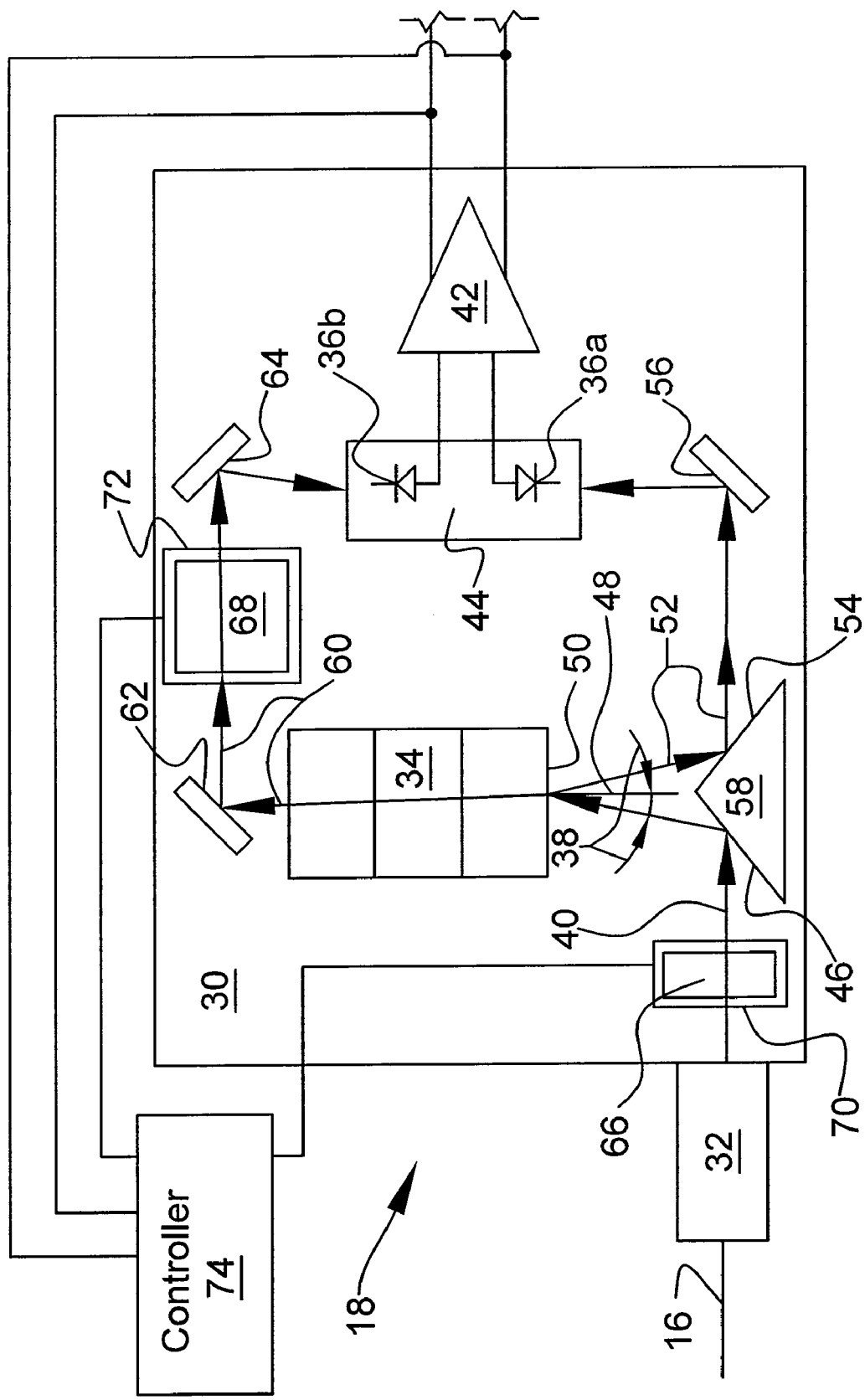
FIG. 3A illustrates a DPSK demodulator in accordance with an embodiment of the present invention.

Referring to FIG. 3A, the demodulator 18 may include a subassembly 30 for converting phase information into electrical signals. The subassembly 30 receives optical signals over the optical fiber 16 connected to the subassembly 30 by means of a coupler 32. A filter 34 is positioned to receive light transmitted over the fiber 16. The filter 34 may be embodied as a single- or multi-cavity filter, such as a Fabry-Perot etalon, or the like. Other filter types such as a Bragg grating or ring resonator may also be used. The filter 34 has a transmission function such that the amount of light transmitted through and reflected from the filter is dependent on the phase difference between adjacent pulses within the received signal. For example, a filter having a bandwidth that is between 0.4 and 0.6 times the bit rate of the received signal may be used. In other embodiments, a filter having a bandwidth that is about 0.5 times the bit rate may be used. In other embodiments, a filter having a free spectral range that is between 0.8 and 1.2 times, or between 0.4 and 0.6 times, the bit rate of the received signal may be used. In other embodiments, a filter having a free spectral range that is about equal to, or about equal to one half of, the bit rate may be used.

A first photodiode 36a is positioned to receive light reflected from the filter 34 and a second photodiode 36b is positioned to receive light transmitted through the filter 34. The outputs of the photodiodes 36a, 36b are evaluated to determine a phase relationship between contiguous bits within the received PSK signal. In the illustrated embodiment, the outputs of the photodiodes 36a, 36b are coupled to a differential amplifier 42, such as a transimpedance amplifier, and the output of the differential amplifier 42 is output to a host device 20. In some embodiments, particularly those receiving DPSK signals, the output of the differential amplifier 42 may provide a binary electrical data signal representing data encoded in the received optical signal. In some embodiments, the output of the differential amplifier 42 may be further processed electrically to extract data, such as by means of a decoder, such as the decoder described hereinbelow. In some embodiments, particularly those receiving DQPSK or DNPSK signals, analysis and decoding of the outputs the differential amplifier may be performed to interpret an electrical signal wherein multiple voltage levels represent different data values.

In some embodiments, the photodiodes 36a, 36b are matched and formed on a common substrate 44 in order to facilitate comparison between their outputs. In such embodiments, elements for redirecting one or both of the transmitted and reflected light from the filter 34 may be used to direct one or both of the transmitted and reflected light to the photodiodes 36a, 36b. Matching of the photodiodes 36a, 36b may refer to path length matching whereby the optical paths that light travels to reach the photodiodes 36a, 36b are identical. In some embodiments, matching refers to the bandwidth and sensitivity of the photodiodes 36a, 36b, which may be the substantially identical or different from one another by amounts effective to cause the outputs of the photodiodes to accurately output an electrical signal corresponding to a given bit value for a given phase difference between bits in an input signal.

In the illustrated embodiment, the input beam 40 is incident on a first mirror 46 that directs the input beam 40 onto the filter 34 at a small angle 38 (e.g. between 7 and 1 degrees, or between 2 and 4 degrees) relative to a line 48 normal to a face 50 of the filter 34. A reflected beam 52 reflected from the face 50 may then be directed by one or more mirrors, such as the illustrated mirror 54 and a mirror 56 to be incident on the first photodiode 36a. In the illustrated embodiment the mirrors 46 and 54 are formed on a single element, such as a triangular piece 58 of polished silicon or other bulk material having reflective surfaces formed thereon such as by depositing a metal layer.

The transmitted beam 60 that is the portion of the input beam 40 transmitted through the filter 34 may be redirected to the photodiode 36b. For example, one or more mirrors 62, 64 may direct the transmitted beam 60 to be incident on the photodiode 36b.

In some embodiments, one or more delay elements 66, 68 may be positioned within the path of one or more of the input beam 40, reflected beam 52, and transmitted beam 60 in order to ensure that portions of the light of an individual pulse or bit in the input beam after being divided into the reflected beam 52 and transmitted beam 60 arrive at the photodiodes 36a, 36b at approximately the same time. In other words, the delay elements 66, 68 facilitate matching of the optical path lengths traveled by different portions the input beam 40. In the illustrated embodiment, the delay element 66 is positioned in the input beam 40 and the delay element 68 is positioned within the transmitted beam 60. The delay elements 66, 68 may be tunable such as by mounting the delay elements 66, 68 on thermoelectric coolers (TEC) 70, 72 in order to change the temperature thereof and cause a change in optical length of the path through the delay elements 66, 68 by changing the index of refraction. The temperature of the delay elements 66, 68 may be set by means of an initial calibration or based on feedback from a controller 74 according to outputs of the photodiodes 36a, 36b.

Figure 3B:
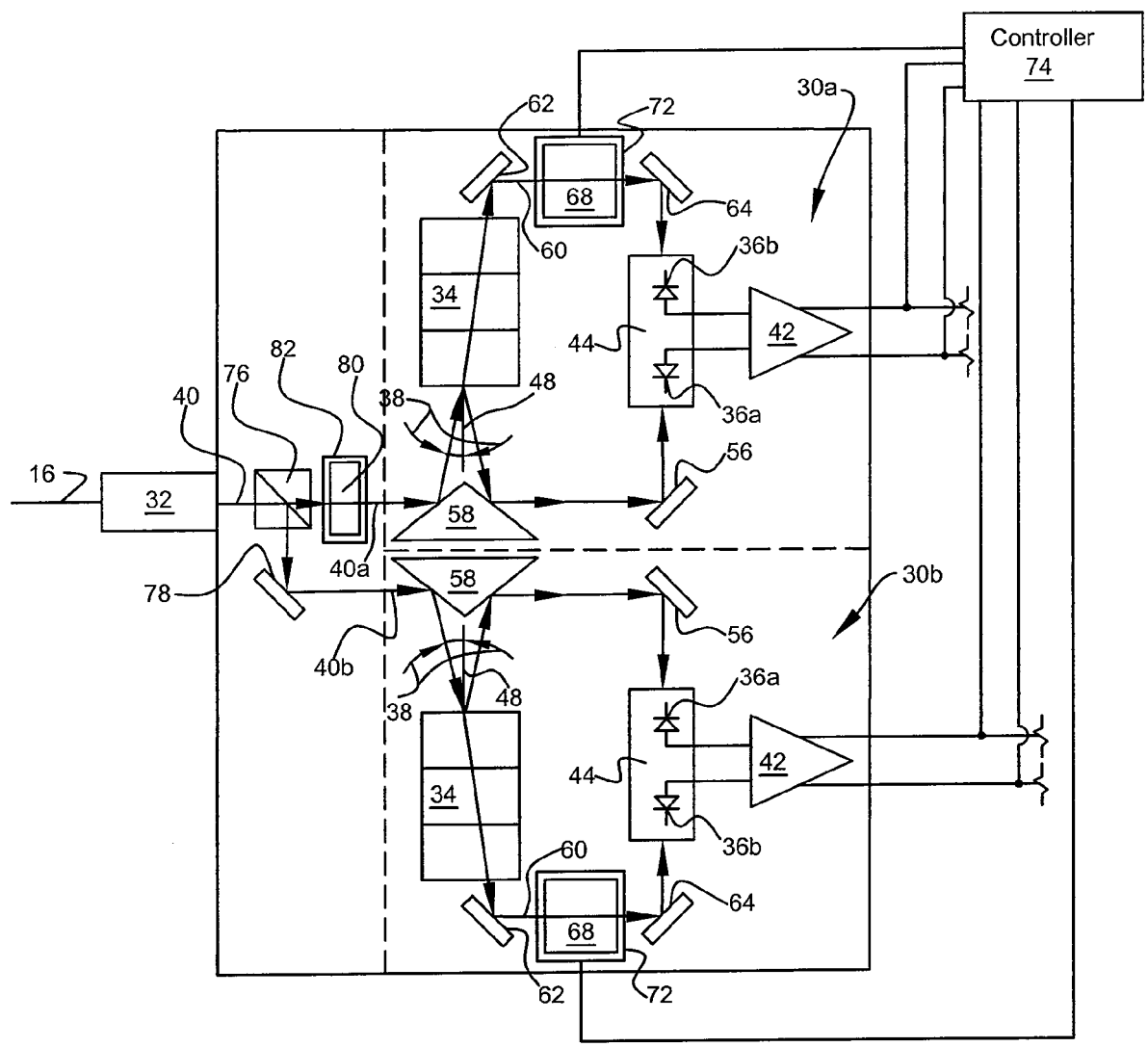
FIG. 3B illustrates a DQPSK demodulator in accordance with an embodiment of the present invention.

Referring to FIG. 3B, in some embodiments, more than one subassembly 30 may be used in order to detect multiple values for the phase difference between contiguous pulses in a received PSK signal. In the illustrated embodiment, two subassemblies 30a, 30b are used. However, three, four, or more subassemblies 30 may be used to detect more phase values. A splitter 76 may divide an input beam 40 into two beams 40a, 40b which are then input to the two subassemblies 30a, 30b. Where N sub assemblies 30 are used, for N greater than two, the splitter 76 may be replaced with an N-way splitter. One or more mirrors 78 may be used to direct one or both of the beams 40a, 40b to the respective subassembly 30a, 30b. A delay element 80 may be placed in a path of one or both of the beams 40a, 40b to ensure that portions of pulses divided into the beams 40a, 40b are detected simultaneously at the photodiodes 36a, 36b of each subassembly 30a, 30b. In other words, the delay element 80 facilitates matching of the optical path length traveled by different portions of the input beam 40. The delay element 80 may be tunable to ensure simultaneous arrival of each portion of a pulse by means of a TEC 82 controlled by the controller 74. The controller 74 may control the TEC 82 based on feedback received from the photodiodes 36a, 36b of the subassemblies 30a, 30b.

Figure 4:
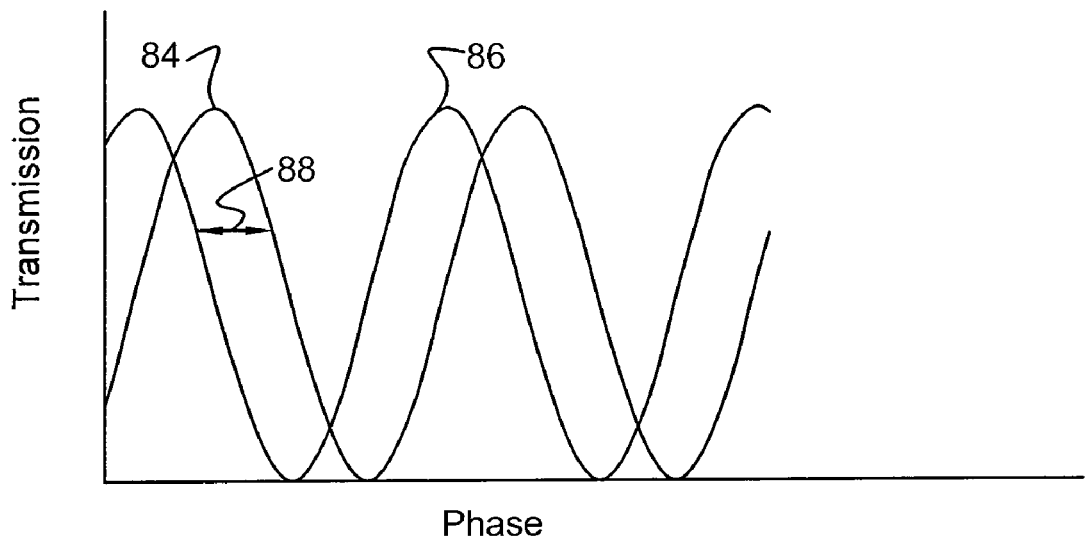
FIG. 4 illustrate transmission with respect to phase for filters suitable for use in a DQPSK demodulator in accordance with an embodiment of the present invention.

Referring to FIG. 4, the transmission function of a filter 34 of a given subassembly 30a, 30b may be offset relative to the filters 34 of other sub assemblies 30a, 30b. FIG. 4 illustrates a plot 84 of transmission with respect to the phase difference between contiguous pulses for a filter 34 of a subassembly, such as subassembly 30a. Reflection of each filter 34 with respect to phase difference may be substantially similar but shifted by $\pi$ relative to the transmission function. Plot 86 is a graph of transmission with respect to phase difference between contiguous pulses for a filter 34 of another subassembly, such as subassembly 30b. As is readily apparent, there is a phase offset 88 between the transmission functions of the filters 34 of the subassemblies 30a, 30b. For DQPSK, the phase offset 88 may be $\pi/2$ or $\pi/4$. For DNPSK where N filters 34 are used, the transmission function of each filter may be offset from every other filter 34 by an integer multiple of $\pi/(N)$, $\pi/(2N)$, or $\pi/(4N)$.

In some embodiments, the transmission functions of the filters 34 with respect to frequency may be spectrally offset from one another an amount effective to achieve the phase offset 88 as discussed hereinabove. For example, for DQPSK demodulation, the offset 88 may be one half or one fourth of the free spectral range (FSR) of the filters 34 or one half or one fourth the bandwidth of the filters 34. For DNPSK demodulation, the transmission functions of the N filters 34 with respect to frequency may be spectrally offset from one another by an integer multiple of 1/(N), 1/(2N), or 1/(4N) times either the bandwidth or the FSR of the filters 34.

In some embodiments, the filters 34 of the two or more subassemblies 30a, 30b may be non-identical. In some embodiments, a difference in bandwidth between two or more of the filters 34 of the two or more subassemblies 30a 30b may be within ten percent of an optimized bandwidth difference that provides an optimized detection of a phase difference in the outputs of the photodiodes 36a, 36b, or a differential amplifier 42 receiving the outputs of the photodiodes 36a, 36b.

Figure 5:
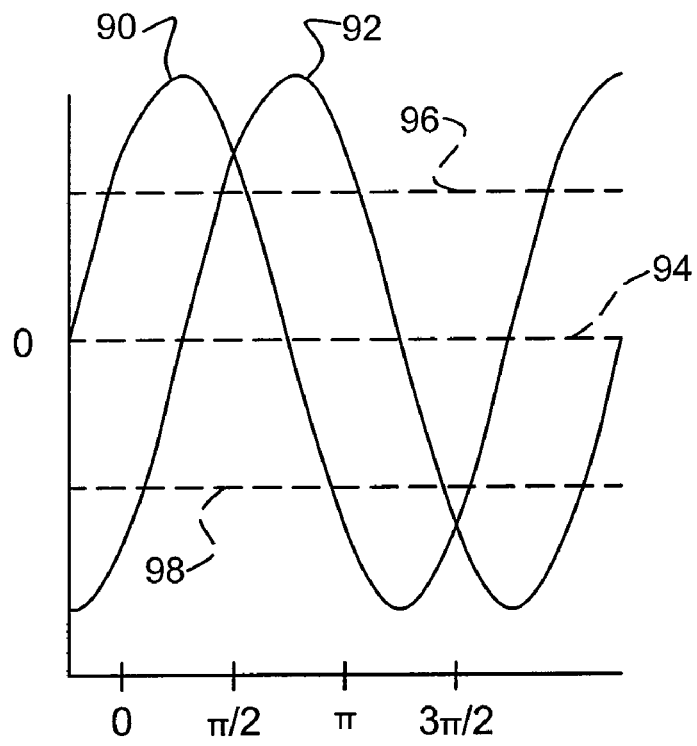
FIG. 5 illustrates transmission with respect to phase for filters suitable for use in a DQPSK demodulator and thresholds for discriminating data values in accordance with an embodiment of the present invention.

FIG. 5 illustrates plots 90, 92 of the outputs of two pairs of photodiodes 36a, 36b for a number of values of the phase difference between adjacent pulses. Each plot represents the difference between a pair of photodiodes 36a, 36b of a single subassembly 30a, 30b. A decoder, such as that described hereinbelow may compare the difference between the outputs of the photodiodes 36a, 36b of each of the one, two, or N, subassemblies 30a, 30b to one or more thresholds in order to determine one or more data symbols corresponding to the phase difference. Alternatively, the outputs of the photodiodes 36a, 36b, or a differential amplifier receiving the outputs of the photodiodes 36a, 36b, may already indicate a decoded bit value such that further decoding is not needed.

In some embodiments, a single threshold 94 is used and symbols may be assigned based on whether the difference between the outputs of the pairs of photodiodes 36a, 36b falls above or below the threshold 94. For example, for a zero phase difference plot 90 is above the threshold 94 whereas plot 92 is below the threshold 94, a unique two bit symbol may be assigned to this combination of outputs such as the symbol 10. For a phase difference of $\pi/2$, both plots 90 and 92 are above the threshold 94 and may be assigned another unique two bit symbol such as 11. For a phase difference of $\pi$, plot 90 is below the threshold 94 and plot 92 is above the threshold 94, which may be assigned a unique two bit symbol such as 01. For a phase difference of $3\pi/2$ both plots 90, 92 are below the threshold 94, which may be assigned a unique two bit symbol such as 00. Where a single subassembly 30 is used a single symbol may be assigned according to a comparison to the threshold 94, such as a 1 where the difference between the outputs of the photodiodes 36a, 36b is greater than a threshold 94 and 0 where it is less than the threshold 94.

Where N subassemblies 30 are used, an N bit symbol may be assigned to $2^N$ combinations of outputs of the pairs of photodiode 36a, 36b of each subassembly with respect to the threshold 94. For example, as shown in Table 1, for each output 1 through N, a comparison to the threshold 94 may be made and each output may be designated as greater than or less than the threshold. In some embodiment, this value may be a bit value such as one for greater than or zero for less than the threshold such that N bit values are generated for each of the N outputs. Alternatively, each possible combination of designations may be assigned an N bit symbol $B_i$. In either case $2^N$ unique N bit sequences are possible.

TABLE 1

Symbol Assignment Matrix

| Output 1 | Output 2 | ... | Output N | Symbol |
|---|---|---|---|---|
| > | > | ... | > | $B_1$ |
| > | > | ... | < | $B_2$ |
| ... | ... | ... | ... | ... |
| < | < | ... | < | $B_{2^N}$ |

Referring again to FIG. 5, in some embodiments two thresholds 96, 98 are used to increase the number of phase differences detectable by the demodulator 18. In such embodiments, a three bit symbol is assigned to combinations of photodiode outputs in embodiments where two subassemblies 30a, 30b are used and an N+1 bit symbol is assigned where N subassemblies 30 are used.

For example, as shown in FIG. 5 for a phase difference between adjacent bits of $\pi/4$, plot 90 is above the upper threshold 96 and plot 92 is neither above the upper threshold nor below the lower threshold 98 and may be assigned a three bit value of, for example, 100 Likewise, at $3\pi/4$, plot 90 neither exceeds the upper threshold 98 nor falls below the lower threshold 98 whereas plot 92 exceeds the upper threshold 98, which combination of outputs may be assigned a three bit value of, for example, 011. Other unique three bit values may be assigned to combinations of outputs of the pairs of photodiodes 36a, 36b for phase differences of 0, $\pi/2$, $5\pi/4$, $3\pi/2$, and $7\pi/4$.

Where N subassemblies 30 are used, an N+1 bit symbol may be assigned to $2^{N+1}$ combinations of outputs of the photodiodes 36a, 36b of each subassembly with respect to the threshold 94. For example, as shown in Table 2, for each output 1 through N, a comparison to the thresholds 96, 98 may be made and each output may be designated as greater than threshold 96 (>), less than the threshold 98 (<), or neither greater than threshold 96 nor less than threshold 98 (0). Each possible combination of designations may be assigned an N+1 bit symbol $B_i$ such that $2^{N+1}$ unique N bit sequences are possible.

TABLE 2

Symbol Assignment Matrix

| Output 1 | Output 2 | ... | Output N | Symbol |
|---|---|---|---|---|
| > | 0 | ... | > | $B_1$ |
| > | > | ... | < | $B_2$ |
| ... | ... | ... | ... | ... |
| < | < | ... | 0 | $B_{2^{N+1}}$ |

Figure 6:
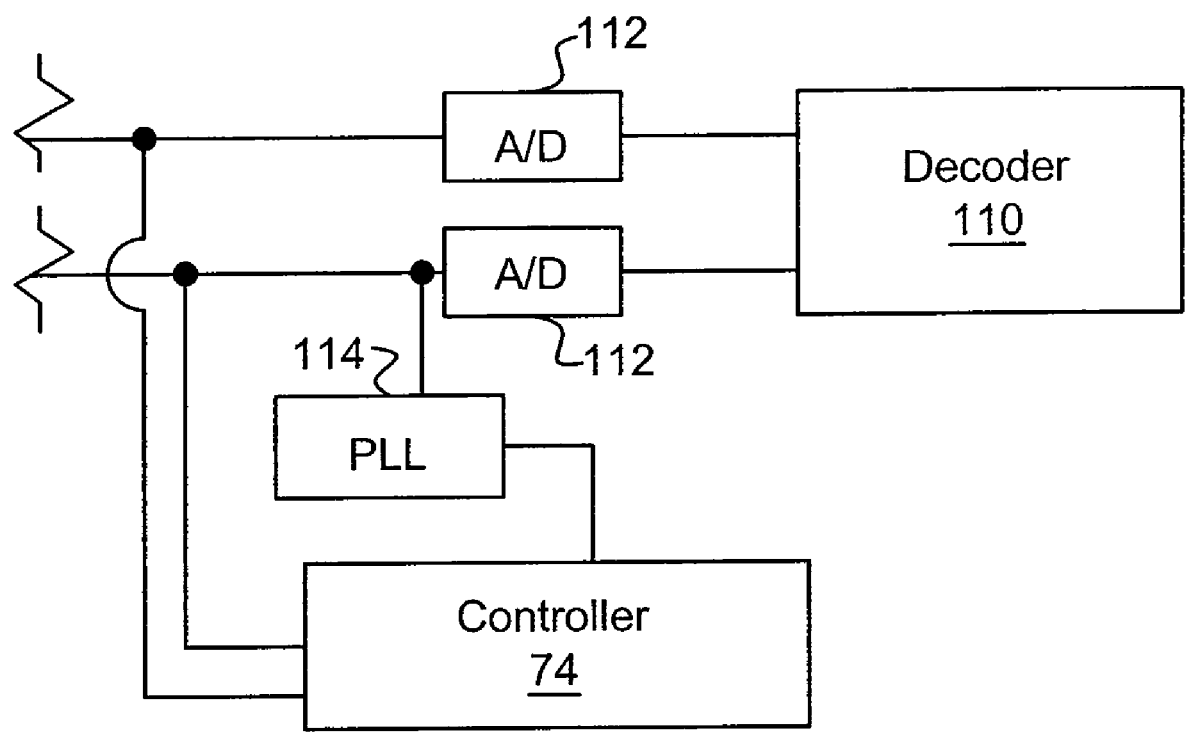
FIG. 6 is a schematic block diagram of a circuit suitable for decoding output of a demodulator in accordance with an embodiment of the present invention.

Referring to FIG. 6, the difference between the outputs of each photodiode pair 36a, 36b of each assembly 30 may be converted into one or more data symbols according to the methods described hereinabove by means of a decoder 110 programmed to perform the above described functions. The outputs of the photodiodes 36a, 36b may be coupled to the decoder 110 by means of one or more analog to digital (A/D) converters 112. The A/D converters 112 may convert outputs from the photodiode pair 36a, 36b to a digital value. The A/D converters 112 may receive the outputs of the photodiodes 36a, 36b by way of the differential amplifiers 42. The A/D converters 112 may convert the difference between the outputs of each pair of photodiodes 36a, 36b into a one, two, three, or higher bit sized value. In some embodiments, the A/D converters 112 may output digital values according to a comparison of the difference between the outputs of each pair of photodiodes 36a, 36b to one threshold 94 or both an upper threshold 96 and a lower threshold.

The A/D converters 112 may sample the outputs of each pair of photodiodes 36a, 36b for each clock cycle of a clock signal generated by a phase locked loop (PLL) 114. The PLL 114 may receive the outputs of one or more of the pairs of photodiodes 36a, 36b and detect one or both of rising and falling edges in the output or outputs and generate a clock signal that is synchronous therewith. In some embodiments, the demodulator 18 receives a return-to-zero (RZ) DPSK, DQPSK, or DNPSK signal such that each bit value is encoded in a pulse having a rising and a falling edge.

The controller 74 may receive the clock signal and the outputs of the pairs of photodiodes 36a, 36b and control one or more TECs 82 in thermal contact with one or more delay elements 80 to ensure that light of each pulse arrives at each pair of photodiodes 36a, 36b substantially simultaneously. In some embodiments, the difference between one pair of photodiodes 36a, 36b is monitored by the PLL 114 to generate the clock signal and the controller 74 controls the TECs 82 of one or more other subassemblies 30a, 30b such that rising or falling edges in the outputs of one or more other pairs of photodiodes 36a, 36b are synchronized with the clock signal.

The decoder 110 may also receive the clock signal from the PLL in order to time when the outputs of the A/D converters 112 are latched into the decoder and when one or more data symbols are output from the decoder 110. The decoder 110 may combine the outputs of the A/D converters 112 into a symbol of one or more bits in length. In some embodiments, the decoder compares digital values of the outputs of the A/D converters 112 to one threshold 94 or both an upper threshold 96 and a lower threshold 98 as described hereinabove to determine which bit value to assign a given output or combination of outputs. Alternatively, the decoder 110 maps the outputs of the A/D converters 112 directly to a one- or multi-bit symbol.

Various different configurations of a subassembly 30 or subassemblies 30a, 30b are possible to accommodate different package sizes. For example, a subassembly 30, 30a, or 30b may be embodied as the subassembly 118 of FIG. 7A. Light from a fiber 16 may be coupled to the subassembly 118 by means of a coupler 32. An input beam 120 is incident on a face 122 of a filter 124. The input beams is at a slight angle 126 (e.g., between 7 and 1, or between 2 and 4 degrees) relative to a line 128 normal to the face 122 of the filter 124 such that a reflected beam 130 is spatially offset from the input beam 120. The reflected beam 130 may be redirected by a mirror 132 through a prism 134 that bends the reflected beam by an angle 136 such that the reflected beam 130 is incident on a photodiode 36a of a photodiode pair. The prism 134 may bend the reflected beam 130 such that a portion 138 of the reflected beam is parallel to the transmitted beam 142, which is the portion of the input beam 120 transmitted through the filter 124.

A delay element 144 may be positioned in the path of one or both of the reflected beam 130 and the transmitted beam 142 and may introduce a delay such that an optical path length from the coupler 32 to the photodiodes 36a, 36b is the same for both the reflected beam 130 and transmitted beam 142 is the same. The delay element 144 may be mounted on a thermoelectric cooler (TEC) 146 in order to control the delay within the delay element 144 by changing the temperature thereof. The TEC 146 may be electrically coupled to a controller 148 configured to control the temperature of the TEC 146 according to feedback from, for example, the photodiodes 36a, 36b to ensure that portions of the same pulse arrive substantially simultaneously at the photodiodes 36a, 36b. In the illustrated embodiment, a lens 150 may be positioned between the coupler 32 and the filter 124 to collimate the input beam 120.

Figure 7A:
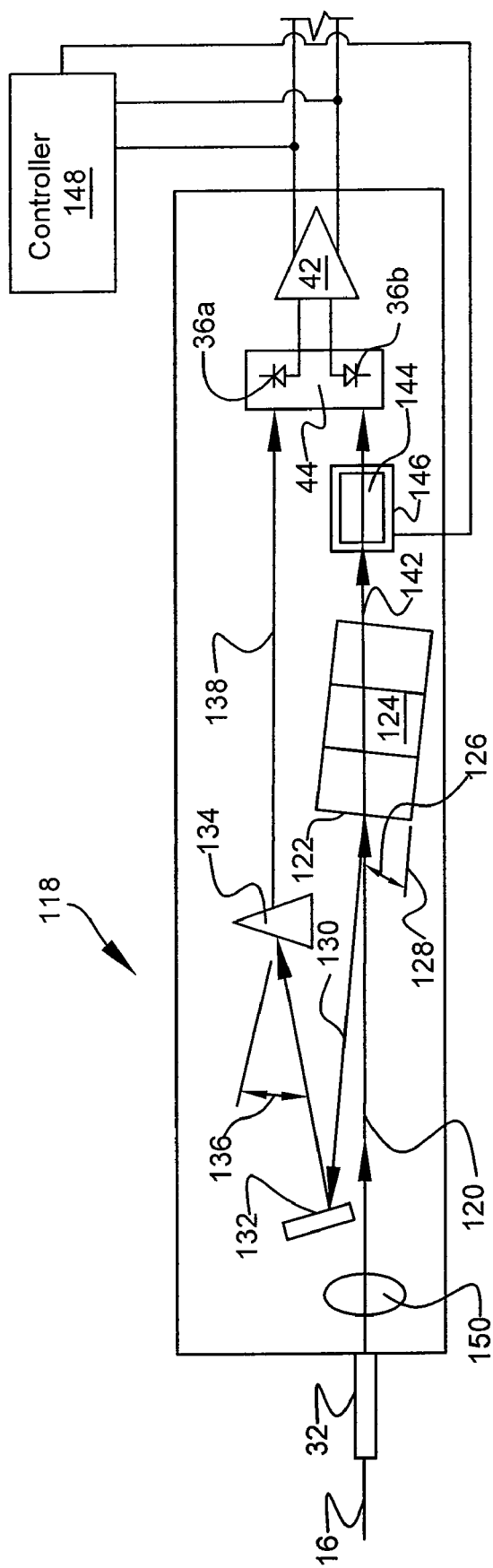
FIG. 7A illustrates an alternative embodiment for a DPSK demodulator in accordance with an embodiment of the present invention.
Figure 7B:
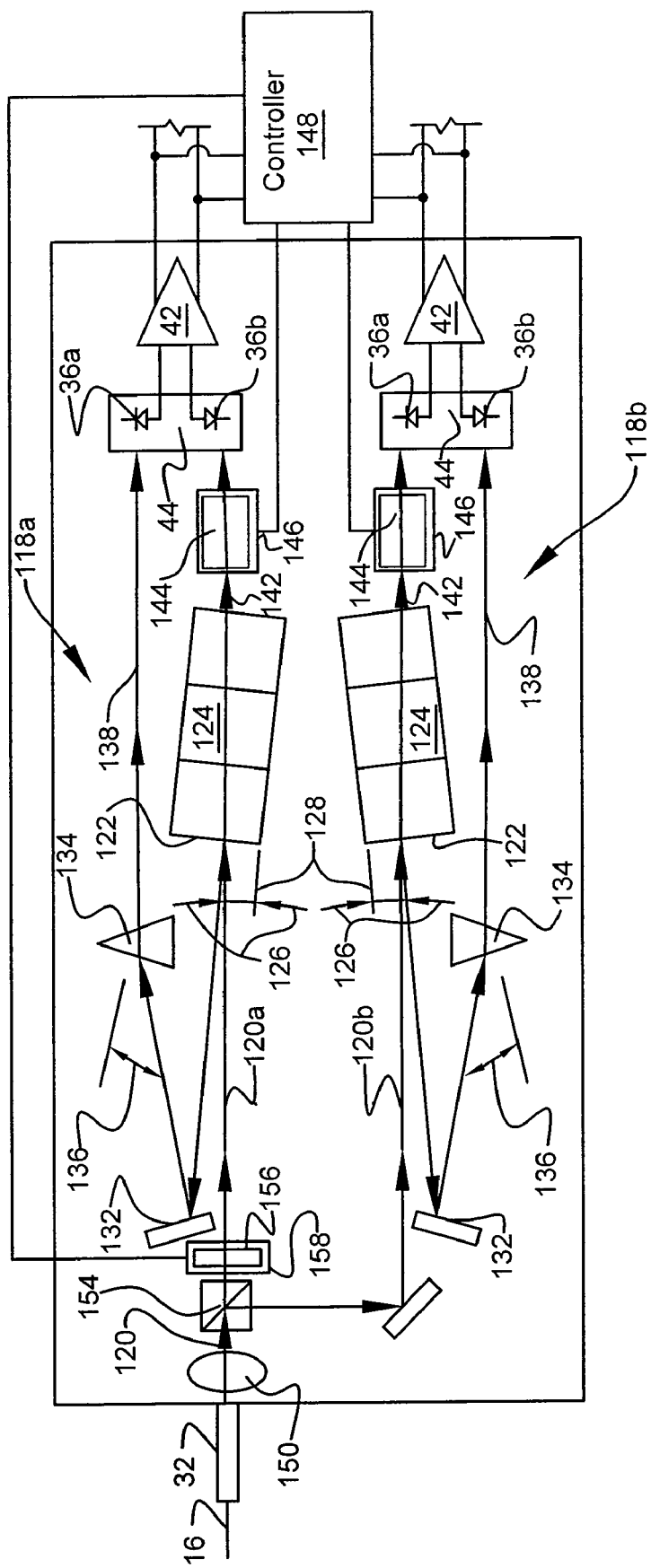
FIG. 7B illustrates a DQPSK demodulator incorporating the demodulator of FIG. 7A in accordance with an embodiment of the present invention.

Referring to FIG. 7B, in some embodiments, the subassemblies 30a, 30b may be embodied as subassemblies 118a, 118b each having the configuration of the subassembly 118. The input beam 120 may be incident on a splitter 154 that divides the input beam 120 into beams 120a, 120b that are input to the subassemblies 118a, 118b. The filters 124 of the subassemblies 118a, 118b may have offset transmission functions with respect to a phase difference between adjacent pulses as described hereinabove with respect to the filters 34 of the subassemblies 30a, 30b.

A delay element 156 may be positioned in the path of one or both of the beams 120a, 120b and may introduce a delay such that an optical path length from the coupler 32 to the photodiodes 36a, 36b of each subassembly 118a, 118b is the same for both beams 120a, 120b. The delay element 156 may be mounted on a thermoelectric cooler (TEC) 158 in order to control the delay within the delay element 156 by changing the temperature thereof. The TEC 158 may be electrically coupled to the controller 148 which may be configured to control the temperature of the TEC 158 according to feedback from, for example, some or all of the photodiodes 36a, 36b of the subassemblies 118a 118b to ensure that portions of the same pulse arrive substantially simultaneously at the photodiodes 36a, 36b of each subassembly 118a, 118b.

Figure 8:
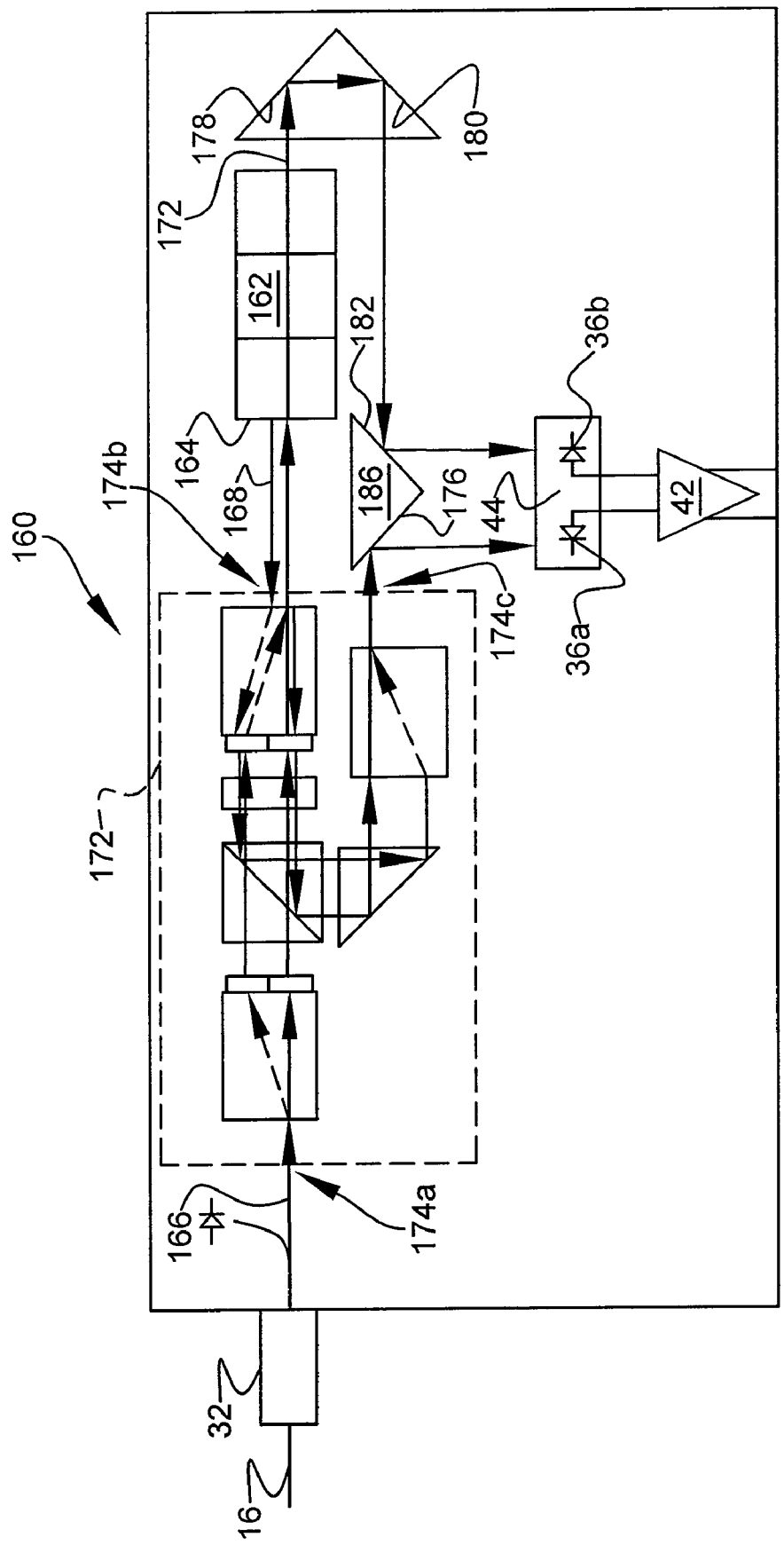
FIG. 8 illustrates an alternative embodiment for a DPSK demodulator in accordance with an embodiment of the present invention.

A subassembly 30, 30a, or 30b may also be embodied as the subassembly 160 of FIG. 8. The subassembly 160 includes a filter 162 having an input face 164 that is substantially perpendicular to an input beam 166 from a fiber 16 and coupler 32. The filter 162 divides the input beam 166 into a reflected beam 168 and a transmitted beam 172. A circulator 172 is positioned in the optical path between the fiber 16 and the filter 162. The circulator 172 includes ports 174a, 174b, and 174c. As known in the art, a circulator is an optical device that directs light input into any of its ports out of an adjacent port. In the illustrated embodiment, light input to port 174a, e.g., the input beam 166, is output from the port 174b. Light input to the port 174b, e.g., the reflected beam 168, is output from the port 174c.

The reflected beam 168 and transmitted beam 172 are incident on photodiodes 36a, 36b, respectively. As in other embodiments described herein, the photodiodes 36a, 36b may be formed on a common substrate 44. In such embodiments, one or more mirrors 176 may be used to direct the reflected beam 168 output from the port 174c to be incident on the photodiode 36a. One or more mirrors, such as the illustrated mirrors 178, 180, and 182 may be used to direct the transmitted beam 170 to be incident on the photodiode 36b. In the illustrated embodiment, the mirrors 176 and 182 are formed on a wedge 186, which may be embodied as a piece of polished silicon or glass either with or without silvered surfaces. In the illustrated embodiment, the mirrors 178 and 180 are formed by internal surfaces of a prism 184 positioned to receive light from the port 174b.

Figure 9:
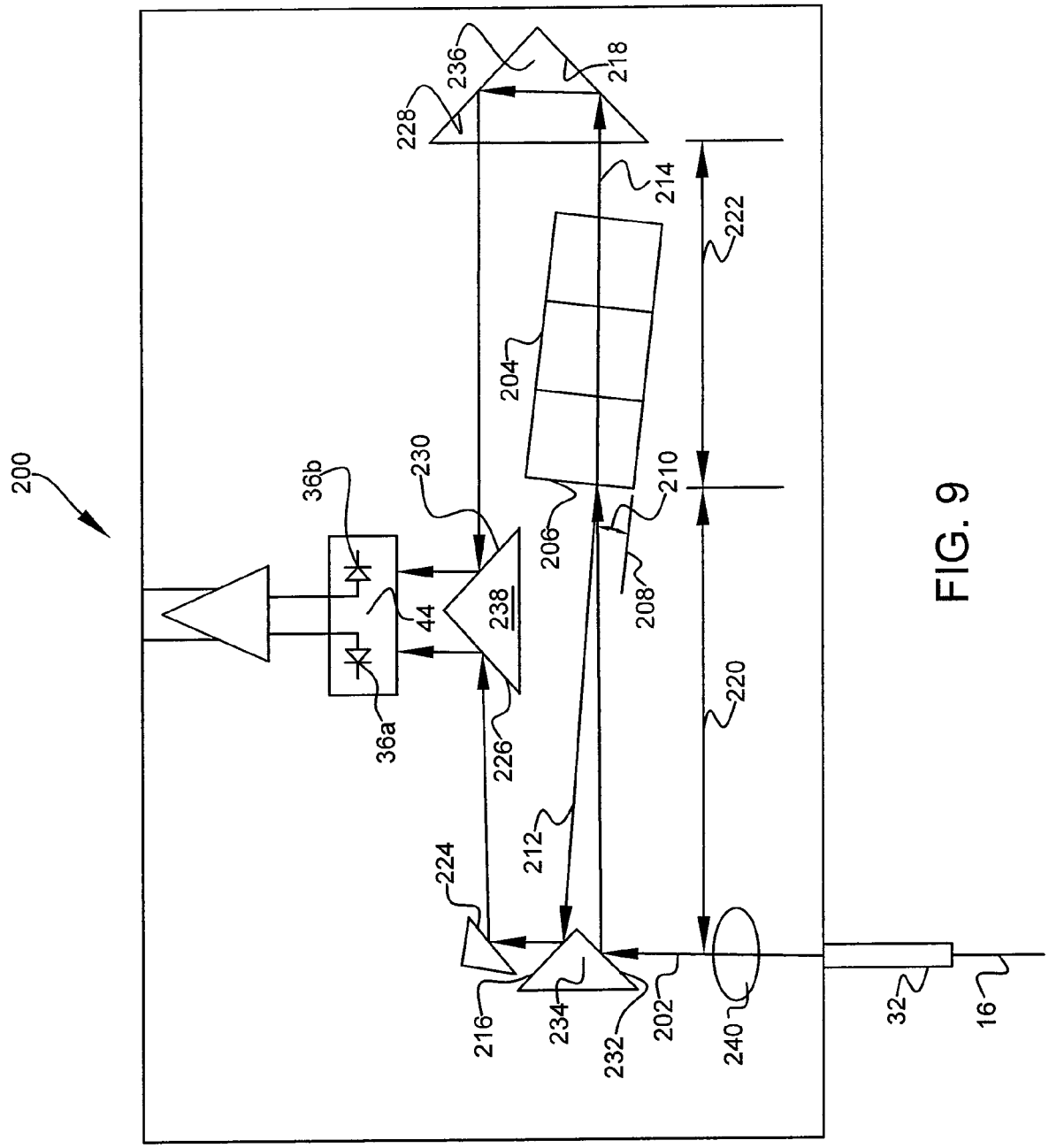
FIG. 9 illustrates another alternative embodiment for a DPSK demodulator in accordance with an embodiment of the present invention.

Referring to FIG. 9, in some embodiments a subassembly 30, 30a, or 30b may be embodied as the illustrated subassembly 200. As in other embodiments described herein a fiber 16 is coupled to the subassembly 200 by means of a coupler 32. An input beam 202 emitted from the fiber 16 is incident on a filter 204. The filter 204 has an input face 206 having a line 208 normal thereto that is at a small angle 210 (e.g., between 1 and 7, or between 2 and 4, degrees) relative to the input beam 202 incident on the face 206. The filter 204 divides the input beam 202 into a reflected beam 212 and a transmitted beam 214. The reflected beam 212 is incident on a mirror 216 and the transmitted beam 214 is incident on a mirror 218. The filter 204 may be positioned a distance 220 from the mirror 216 and a distance 222 from the mirror 218 such that portions of the same pulse in the reflected beam 212 and the transmitted beam 214 arrive at photodiodes 36a, 36b, respectively, substantially simultaneously.

The reflected beam 212 may be further directed by mirror 224 and mirror 226 to be incident on the photodiode 36a. The transmitted beam may be further directed by mirror 228 and mirror 230 to be incident on the photodiode 36b. In the illustrated embodiment, an additional mirror 232 changes the direction of the input beam 202 to be incident on the input face 206 of the filter 204.

In the illustrated embodiment, the mirror 232 and mirror 216 are faces formed on a wedge 234 such as by means of depositing a metallic surface or by polishing. In the illustrated embodiment, mirrors 218 and 228 are internal surfaces of a prism 236. Mirrors 226 and 230 may likewise be embodied as surfaces formed on a wedge 238 such as by means of deposition of a metallic layer or by polishing.

As in other embodiments described herein the photodiodes 36a, 36b may be matched and formed in a common substrate 44. The input beam 40 may also pass through a collimating lens 240 prior to being incident on the filter 204.

Figure 10:
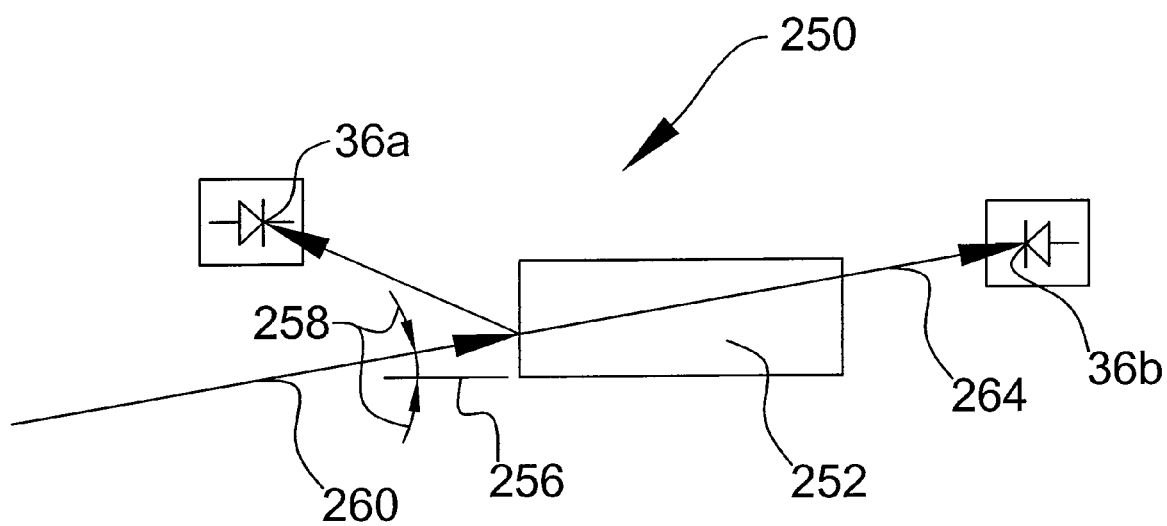
FIG. 10 illustrates another alternative embodiment for a DPSK demodulator in accordance with an embodiment of the present invention.

Referring to FIG. 10, in an alternative embodiment, a subassembly 30, 30a, 30b may be embodied as the illustrated subassembly 250. The subassembly 250 includes a filter 252 having an input face 254 having a normal line 256 that is at an angle 258 (e.g., between 1 and 7, or between 2 and 4, degrees) relative to an input beam 260. As in other embodiments described herein, the input beam 260 may be emitted from a fiber 32 coupled to the subassembly 250 by means of a coupler 32.

In the illustrated embodiment the photodiodes 36a is positioned such that a reflected beam 262 is incident thereon without any intervening redirecting elements such as mirrors. The reflected beam 262 is the portion of the input beam 260 reflected from the filter 252. The photodiode 36b is positioned such that a transmitted beam 264 is incident thereon without any intervening redirecting elements. The transmitted beam 264 is the portion of the input beam 260 that is transmitted through the filter 252. Inasmuch as the photodiodes are no longer formed on a common substrate, obtaining near identical response may be difficult to achieve. In such embodiments, electrical compensation may be used, such as in the decoder 110, such that the difference between the outputs of the photodiodes 36a, 36b correctly reflects the phase relationship between adjacent pulses in the input beam 260.

Figure 11:
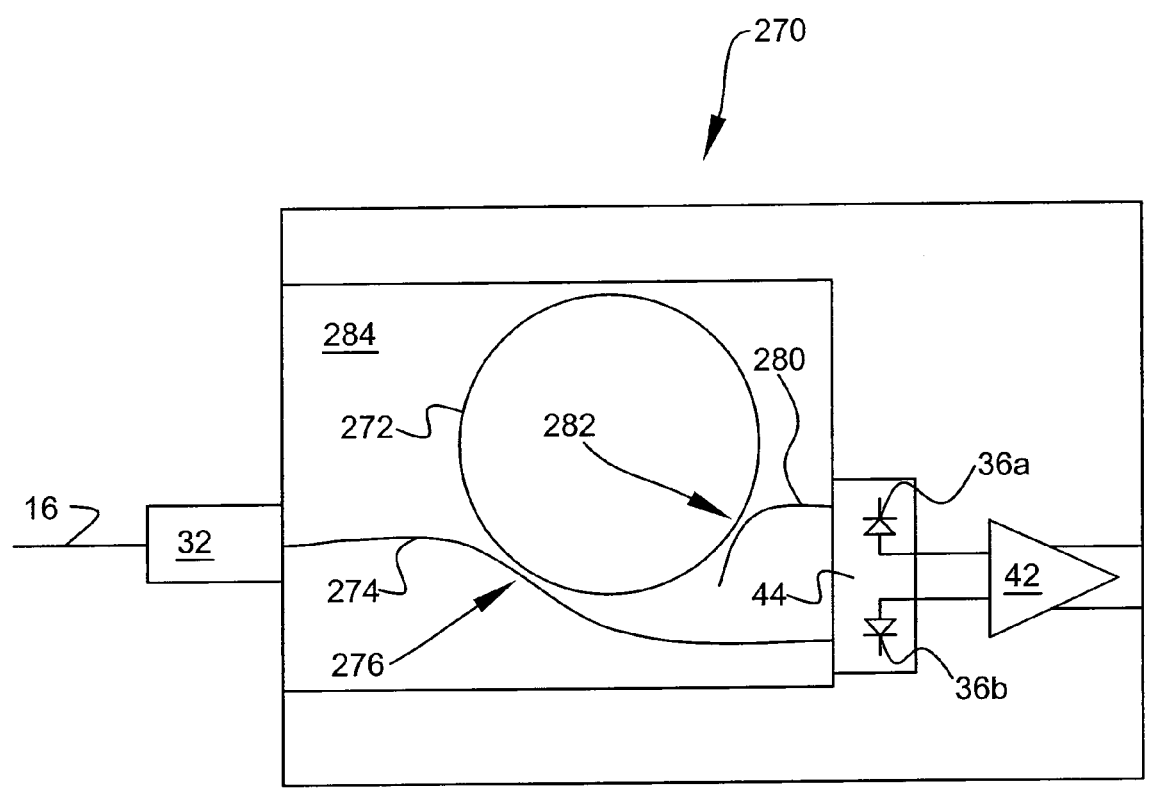
FIG. 11 illustrates another alternative embodiment for a DPSK demodulator in accordance with an embodiment of the present invention.

Referring to FIG. 11, the filters described hereinabove may be embodied as any optical filter such as an etalon, coupled multicavity filter, single- or multi-ring resonator filter, single- or multi-cavity etalon, MEMS based filters (wave shaper), or the like.

FIG. 11 illustrates a subassembly 270 that may be used in the place of any of the subassemblies 30, 30a, 30b. The illustrated subassembly 270 includes a ring resonator 272. The subassembly 270 receives light from the fiber 16 by means of a coupler 32. A first path 274 transmits light from the fiber 16 to a photodiode 36a. A coupler 276 couples a portion of light transmitted over the first path 274 to the ring resonator 272. A second path 280 transmits a portion of light from the ring resonator to a photodiode 36b. The second path 280 is coupled to the ring resonator 272 by means of a coupler 282. In the illustrated embodiment, the ring resonator 272, first path 274, and second path 280 are formed in a planar lightwave circuit (PLC) 284. As in other embodiments described herein, the photodiodes 36a, 36b may be matched and formed on a common substrate 44.

Figure 12:
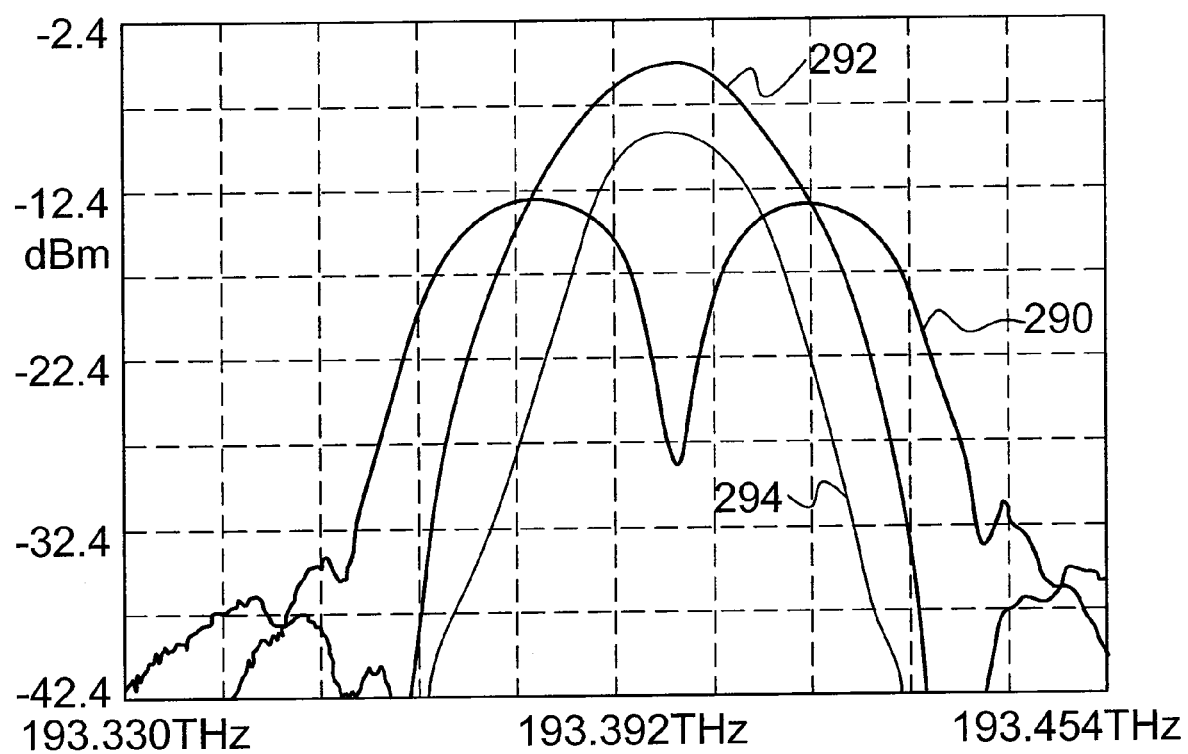
FIG. 12 is a graph illustrating performance of a delay line interferometer and a filter suitable for use in a demodulator accordance with an embodiment of the present invention.

Referring to FIG. 12, in conventional DPSK demodulators, phase detection is performed by means of a delay line interferometer (DLI) or Mach-Zehnder interferometer. A typical DLI demodulator has a destructive interference port and a constructive interference port. An example output of the destructive interference port of a 66.7 GHz DLI with respect to frequency is illustrated by plot 290. An example output of the constructive interference port with respect to frequency for the same DLI is shown by plot 292. Plot 294 illustrated output with respect to frequency for an optical filter having a bandwidth of 24 GHz. As is readily apparent, the transmission function of the optical filter approximates the output of the constructive interference port, which indicates the suitability of an optical filter to perform phase detection formerly performed by means of a DLI.

Figure 13:
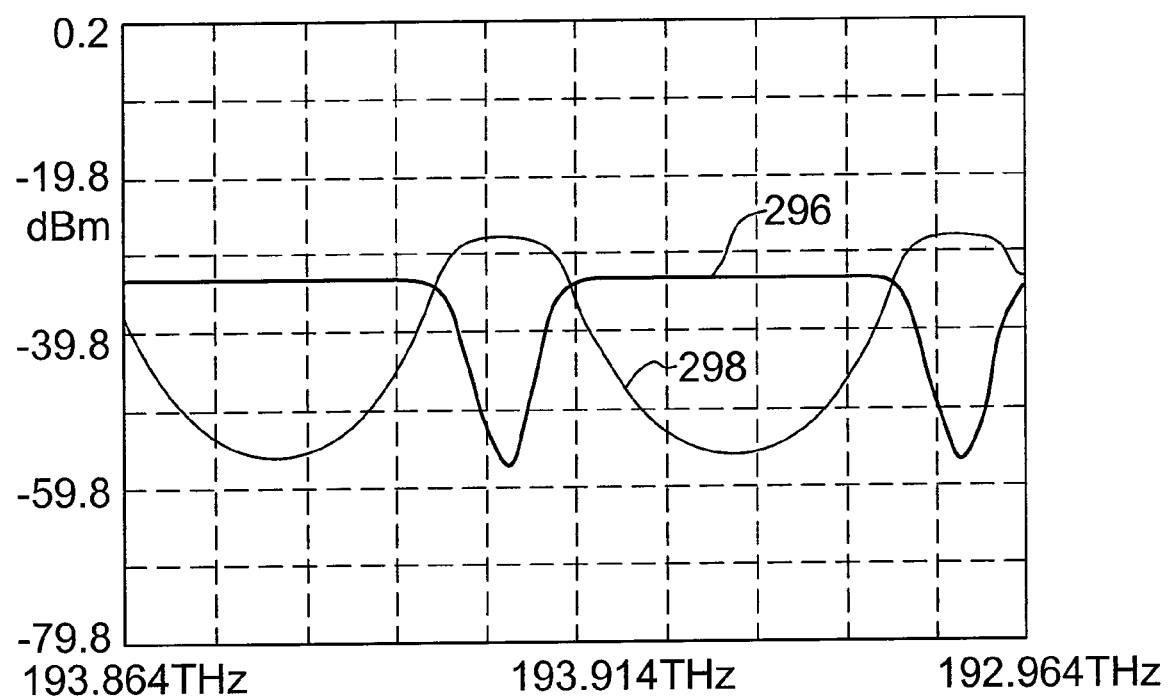
FIG. 13 is a graph illustrating transmission and reflection performance with respect to frequency of a filter suitable for use in a demodulator in accordance with an embodiment of the present invention.

FIG. 13 illustrates both a plot 296 of transmission with respect to frequency and a plot 298 of reflection with respect to frequency for a three cavity filter oriented three degrees relative to an optical axis of an input beam. The plot 296 illustrates an extinction ratio in transmission of 28.4 dB and the plot 298 illustrates an extinction ratio in reflection of 24.2 dB, which indicates that the filter could provide demodulation performance similar to a DLI having the transmission and reflection functions illustrated in FIG. 11.

Another important aspect of filters 34, 124, 162, 204, 252, 272 according to the forgoing embodiments is the periodic nature of the transmission and reflection peaks evident in the plots 296, 298 of FIG. 13. A filter according to any of the foregoing embodiments is characterized by a free spectral range, which is the spectral distance between transmission peaks or reflection peaks. Accordingly, wide tunability may be accomplished to accommodate a wide range of carrier frequencies by simply positioning the carrier frequency of a PSK signal adjacent different transmission and reflection peaks. Transmission and reflection peaks of the filters 34, 124, 162, 204, 252, 272 may also be adjusted to fine tune the transmission and reflection properties by adjusting the temperature thereof. Alternatively, the frequency response of the filters 34, 124, 162, 204, 252, 272 may be adjusted by means of angle tuning, application of an electric or magnetic field, or other means for adjusting optical properties.

For example, in one application a PSK demodulator 18 may receive a first signal having a first carrier frequency and may include a filter 34, 124, 162, 204, 252, 272 according to the foregoing embodiments that is tuned to demodulate the first signal into a data signal as described for the embodiments disclosed hereinabove. The PSK demodulator 18 may then receive a second signal having a carrier frequency different from the first signal. The filter 34, 124, 162, 204, 252, 272 according to any of the foregoing embodiments may then be tuned by means of a temperature change, electric field, magnetic field, angle change, or the like such that the filter 34, 124, 162, 204, 252, 272 of the PSK demodulator has a frequency response effective to convert the second signal into a data signal as described for the embodiments disclosed hereinabove. Alternatively, the first signal may have a spectral position relative to a first transmission peak of the filter 34, 124, 162, 204, 252, 272 effective to enable the filter 34, 124, 162, 204, 252, 272 to demodulate the first signal. The second signal may have a spectral position relative to a second transmission peak of the filter 34, 124, 162, 204, 252, 272 effective to enable the filter 34, 124, 162, 204, 252, 272 to demodulate the second signal either with or without adjusting the spectral response of the filter 34, 124, 162, 204, 252, 272 an amount effective to enable the filter 34, 124, 162, 204, 252, 272 to demodulate the second signal.

Figure 14:
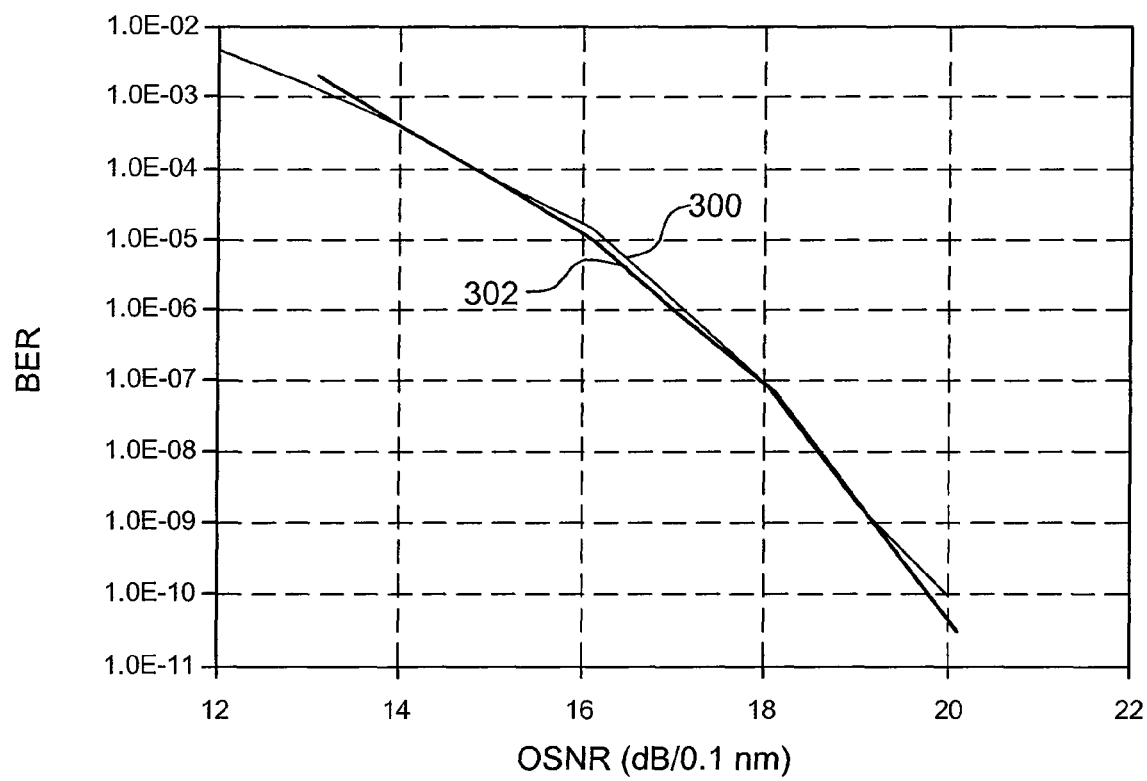
FIG. 14 is a graph illustrating bit error rate with respect to optical signal to noise ratio for a delay line interferometer and a demodulator in accordance with an embodiment of the present invention.

FIG. 14 illustrates a plot 300 of bit error rate (BER) for a range of optical signal to noise ratios (OSNR) for PSK demodulator 18 including an optical subassembly according to one of the foregoing embodiments including a 24 GHz filter and balanced photodiodes 36a, 36b. Plot 302 illustrates BER with respect to OSNR for an Optoplex DLI with external path length matching. As is readily apparent, the performance of a PSK demodulator 18 according to the foregoing embodiments is comparable to that of a conventional DLI PSK demodulator.

Figure 15:
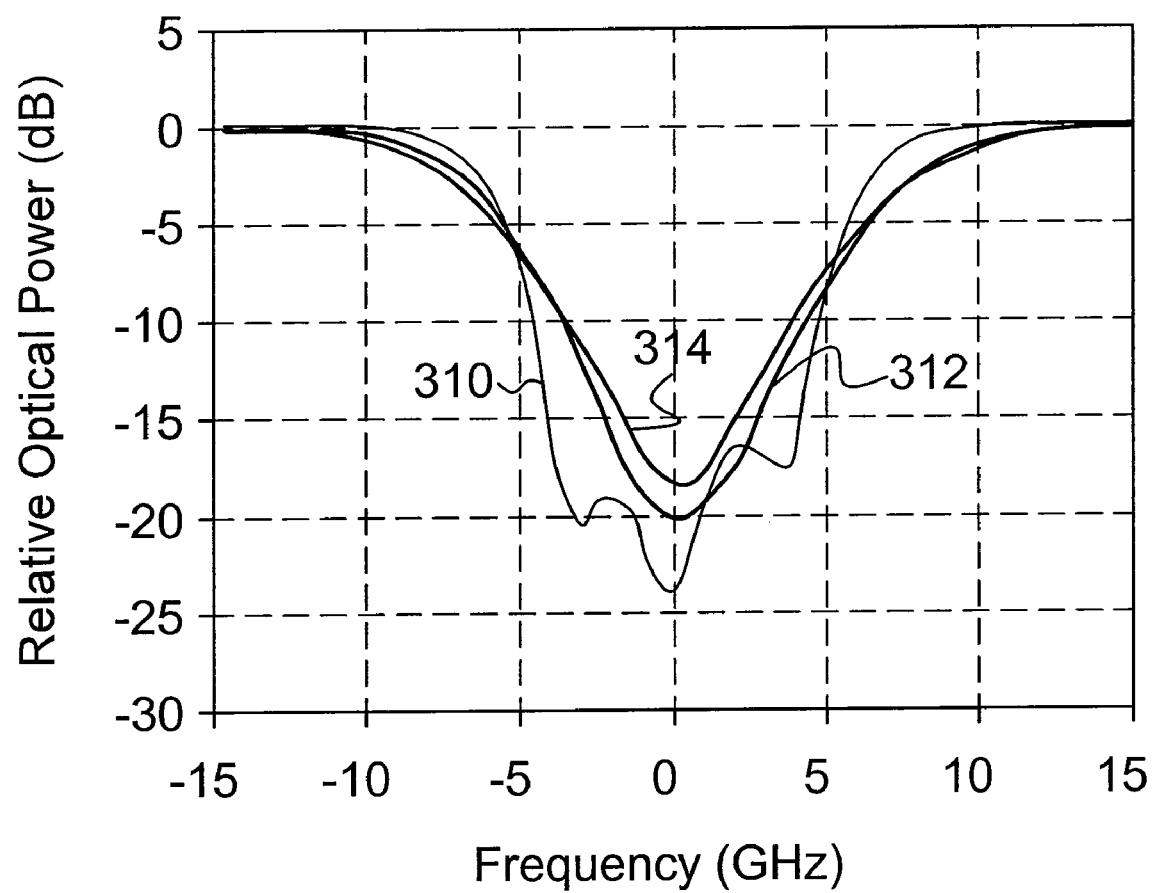
FIG. 15 is a graph illustrating transmission with respect to frequency for different input face angles of filters suitable for use in a demodulator in accordance with an embodiment of the present invention.

Referring to FIG. 15, the amount of light transmitted with respect to frequency through a filter of any of the foregoing embodiments may be tuned by adjusting the angle of incidence of a beam input to the filter such as the angle 38 in the embodiment of FIGS. 3A and 3B, the angle 126 of FIGS. 7A and 7B, the angle 208 of FIG. 9, or the angle 258 of FIG. 10. FIG. 15 includes plot 310 for a zero degree angle relative to a normal vector to an input face of the filter. Plot 312 illustrates a three degree offset and plot 314 illustrates a five degree offset. As is readily apparent, the peak extinction for the transmission function is affected by angle tuning, which therefore can be used to control the relationship between the amounts of reflected and transmitted light for a given filter.

Figure 16:
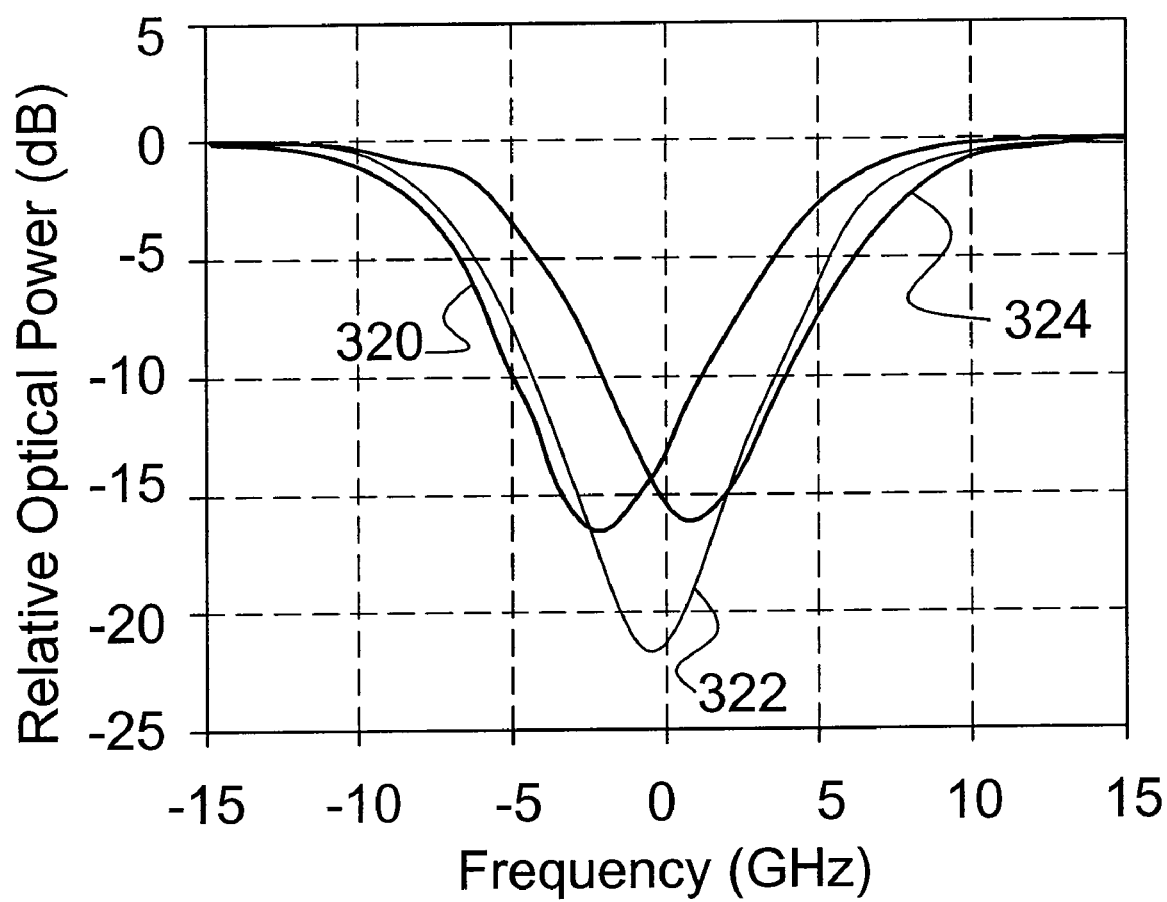
FIG. 16 illustrate detected optical power with respect to frequency for various photodiodes suitable for use in accordance with an embodiment of the present invention.

FIG. 16 illustrates measured intensity for reflection from a filter, such as a filter 34, 124, 162, 204, 252, 272 according to any of the foregoing embodiments, with respect to frequency, where the reflected light is measured using various types of photodiodes. Plot 320 illustrates intensity measured using an optical power meter, plot 322 illustrates measured intensity using a 12 μm photodiode, and plot 324 illustrates measured intensity using a 400 μm photodiode. As is readily apparent, the 12 μm photodiode provides the deepest extinction and therefore may be advantageously used for the photodiodes 36a, 36b in the embodiments described hereinabove. Other types of photodiodes, including 400 μm photodiodes may also provide acceptable performance.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A phase-shift keyed signal demodulator comprising:
   a filter positioned to receive an input beam and configured to reflect and transmit light associated with the input beam based on a phase relationship between adjacent bits within the input beam;
   a first photodiode positioned to receive light reflected from the filter;
   a second photodiode positioned to receive light transmitted through the filter;
   and
   a differential amplifier coupled to the first and second photodiodes, the output of the differential amplifier corresponding to the phase relationship between adjacent bits within the input beam according to a difference between outputs of the first and second photodiodes.

2. The demodulator of claim 1, further comprising a delay element positioned to receive one of the light transmitted through the filter and light reflected from the filter, the delay element having a delay such that corresponding portions of the first and second beams arrive substantially simultaneously at the first and second photodiodes.

3. The demodulator of claim 1, wherein the first and second photodiodes are matched.

4. The demodulator of claim 3, wherein the first and second photodiodes are formed on a common substrate.

5. The demodulator of claim 1, wherein the filter has an input face having a normal vector that is angularly offset with respect to a direction of propagation of the input beam.

6. The demodulator of claim 1, further comprising at least one redirecting element positioned to redirect at least one of light reflected from the filter and light transmitted through the filter.

7. The demodulator of claim 1, wherein the outputs of the first and second photodiodes are coupled to a decoder by a differential amplifier.

8. The demodulator of claim 1, wherein the filter has a bandwidth that is greater than about one half of a bit rate of the input beam.

9. The demodulator of claim 1, wherein the filter has a free spectral range that is equal to or greater than a bit rate of the input beam.

10. The demodulator of claim 1, wherein the filter is a multi-cavity etalon.

11. A method for demodulating a phase-shift keyed signal comprising:
  transmitting the phase-shift keyed signal to a filter, the filter configured to reflect and transmit portions of the phase-shift keyed signal based on a phase relationship between adjacent bits within the phase-shift keyed signal;
  receiving a reflected portion of the phase-shift keyed signal reflected from the filter at a first photodiode;
  receiving a transmitted portion of the phase-shift keyed signal transmitted through the second photodiode;
  processing outputs of the first and second photodiodes; and
  outputting a symbol according to the processing of the outputs of the first and second photodiodes.

12. The method of claim 11, wherein the phase-shift keyed signal includes a series of pulses having a bit rate and wherein the bandwidth of the filter is at least one half the bit rate.

13. The method of claim 12, wherein a delay element is at least one of positioned between the filter and the first photodiode and positioned between the filter and the second photodiode; and wherein the delay element has a delay effective to cause portions of each pulse in the reflected and transmitted portions to arrive substantially simultaneously at the first and second photodiodes.

* * * * *